US009619273B2

(12) United States Patent
Lao et al.

(10) Patent No.: US 9,619,273 B2
(45) Date of Patent: *Apr. 11, 2017

(54) PROFILING MULTIPLE VIRTUAL MACHINES IN A DISTRIBUTED SYSTEM

(71) Applicant: International Business Machines Corporation, Armonk, NY (US)

(72) Inventors: Zai Ming Lao, Beijing (CN); Liang Miao, Beijing (CN); Hai Long Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/049,254

(22) Filed: Feb. 22, 2016

(65) Prior Publication Data

US 2016/0306646 A1  Oct. 20, 2016

Related U.S. Application Data

(63) Continuation of application No. 14/685,734, filed on Apr. 14, 2015, now Pat. No. 9,448,833.

(51) Int. Cl.
  *G06F 9/455* (2006.01)
(52) U.S. Cl.
  CPC ............... *G06F 9/45558* (2013.01); *G06F 2009/45591* (2013.01); *G06F 2009/45595* (2013.01)
(58) Field of Classification Search
  CPC ............ G06F 9/45558; G06F 2009/45595
  USPC .......................................................... 718/1
  See application file for complete search history.

(56) References Cited

U.S. PATENT DOCUMENTS

| 6,904,594 | B1 * | 6/2005 | Berry ................. G06F 11/3404 718/100 |
| 7,454,486 | B2 | 11/2008 | Kaler et al. |
| 7,788,664 | B1 * | 8/2010 | Janakiraman ....... G06F 9/45533 718/1 |
| 7,895,642 | B1 * | 2/2011 | Larson .................... H04L 63/20 718/1 |

(Continued)

OTHER PUBLICATIONS

Awadallah el al. "The vMatrix: A Network of Virtual Machine Monitors for Dynamic Content Distribution", 2002, Stanford University.*

(Continued)

*Primary Examiner* — Wei Zhen
*Assistant Examiner* — Junchun Wu
(74) *Attorney, Agent, or Firm* — Nolan M. Lawrence

(57) ABSTRACT

A task comprising at least a first subtask on a computer system is analyzed. As part of the analysis, a profiler controller transmits a first profile instruction to a first profiler instance. The profiler controller transmits a second profile instruction to a second profiler instance. In response to the first profile instruction, the first profiler instances embeds a first task identifier into a first subtask request sent by a first virtual machine. In response to the second profile instruction, the second profiler instance captures the first task identifier from the first subtask request received by a second process virtual machine. The profiler controller identifies an execution instance of the task of the computer system based on the first copy and the second copy of the first task identifier received from the first profiler instance and the second profiler instance, respectively.

11 Claims, 4 Drawing Sheets

(56) References Cited

U.S. PATENT DOCUMENTS

| | | |
|---|---|---|
| 8,464,250 B1 | 6/2013 | Ansel |
| 8,495,587 B2 | 7/2013 | Bittles et al. |
| 8,615,579 B1* | 12/2013 | Vincent ................. G06F 9/4856 709/223 |
| 8,671,404 B2 | 3/2014 | DeHaan et al. |
| 8,726,240 B2 | 5/2014 | Gallagher et al. |
| 8,782,614 B2 | 7/2014 | Basak et al. |
| 8,819,673 B1 | 8/2014 | Wilkinson et al. |
| 9,037,758 B1 | 5/2015 | Sarkar et al. |
| 9,098,214 B1* | 8/2015 | Vincent ................. G06F 9/4856 |
| 9,250,863 B1* | 2/2016 | Vincent ............... G06F 9/45558 |
| 2005/0120341 A1* | 6/2005 | Blumenthal ........ G06F 11/3428 718/1 |
| 2010/0031252 A1 | 2/2010 | Horwitz |
| 2010/0333071 A1 | 12/2010 | Kuiper et al. |
| 2011/0179160 A1 | 7/2011 | Liu et al. |
| 2012/0137291 A1 | 5/2012 | Bacher et al. |
| 2012/0284628 A1* | 11/2012 | Wong ................... H04L 67/306 715/736 |
| 2012/0297380 A1 | 11/2012 | Colbert et al. |
| 2013/0097601 A1* | 4/2013 | Podvratnik ........... G06F 9/5027 718/1 |
| 2013/0132955 A1* | 5/2013 | Bolte ................. G06F 9/45533 718/1 |
| 2014/0082614 A1* | 3/2014 | Klein ................. G06F 9/45558 718/1 |
| 2014/0201732 A1* | 7/2014 | Haag ................... G06F 9/45533 718/1 |
| 2014/0237454 A1 | 8/2014 | Delporte |
| 2014/0337836 A1 | 11/2014 | Ismael |
| 2015/0106807 A1 | 4/2015 | Reddy et al. |
| 2015/0339156 A1 | 11/2015 | Vincent et al. |
| 2016/0019080 A1* | 1/2016 | Chang ................. G06F 9/45558 718/1 |

OTHER PUBLICATIONS

Arnold et al. "Improving Virtual Machine Performance Using a CrossRun Profile Repository", 2005, ACM.*

Cerroni, "Multiple Virtual Machine Live Migration in Federated Cloud Systems", 2014, IEEE.*

Do et al. "Profiling Applications for Virtual Machine Placement in Clouds", 2011, IEEE.*

Hoorn et al., "Kieker: a framework for application performance monitoring and dynamic software analysis", ICPE '12 Proceedings of the 3rd ACM/SPEC International Conference on Performance Engineering, pp. 247-248. ACM New York, NY, USA © 2012. ISBN: 978-1-4503-1202-8. DOI: 10.1145/2188286.2188326.

Kim et al., "IntroPerf: Transparent Context-Sensitive Multi-Layer Performance Inference using System Stack Traces", Sigmetrics 2014,The 2014 ACM international conference on Measurement and modeling of computer systems, pp. 235-247. ACM New York, NY, USA 02014. ISBN: 978-1-4503-2789-3. DOI: 10.1145/2591971. 2592008.

Lao et al., "Profiling Multiple Virtual Machines in a Distributed System", U.S. Appl. No. 14/685,734, filed Apr. 14, 2015.

List of IBM Patents or Patent Applications Treated as Related, Feb. 18, 2016, 2 pages.

Du et al., "Performance Profiling of Virtual Machines", VEE'11, Mar. 9-11, 2011, 12 pages, Copyright 2011 ACM.

Sirer et al., "Design and implementation of a distributed virtual machine for networked computers", 17th ACM Symposium on Operating System Principles, Published as Operating Systems Review 34(5), pp. 202-216, Dec. 1999.

Hung et al., "System-Wide Profiling and Optimization with Virtual Machines", pp. 395-400, Copyright 2012 IEEE.

Huang et al., "A Case for High Performance Computing with Virtual Machines", ICS'06, Jun. 28-30, 2006, pp. 125-134, Copyright 2006 ACM.

* cited by examiner

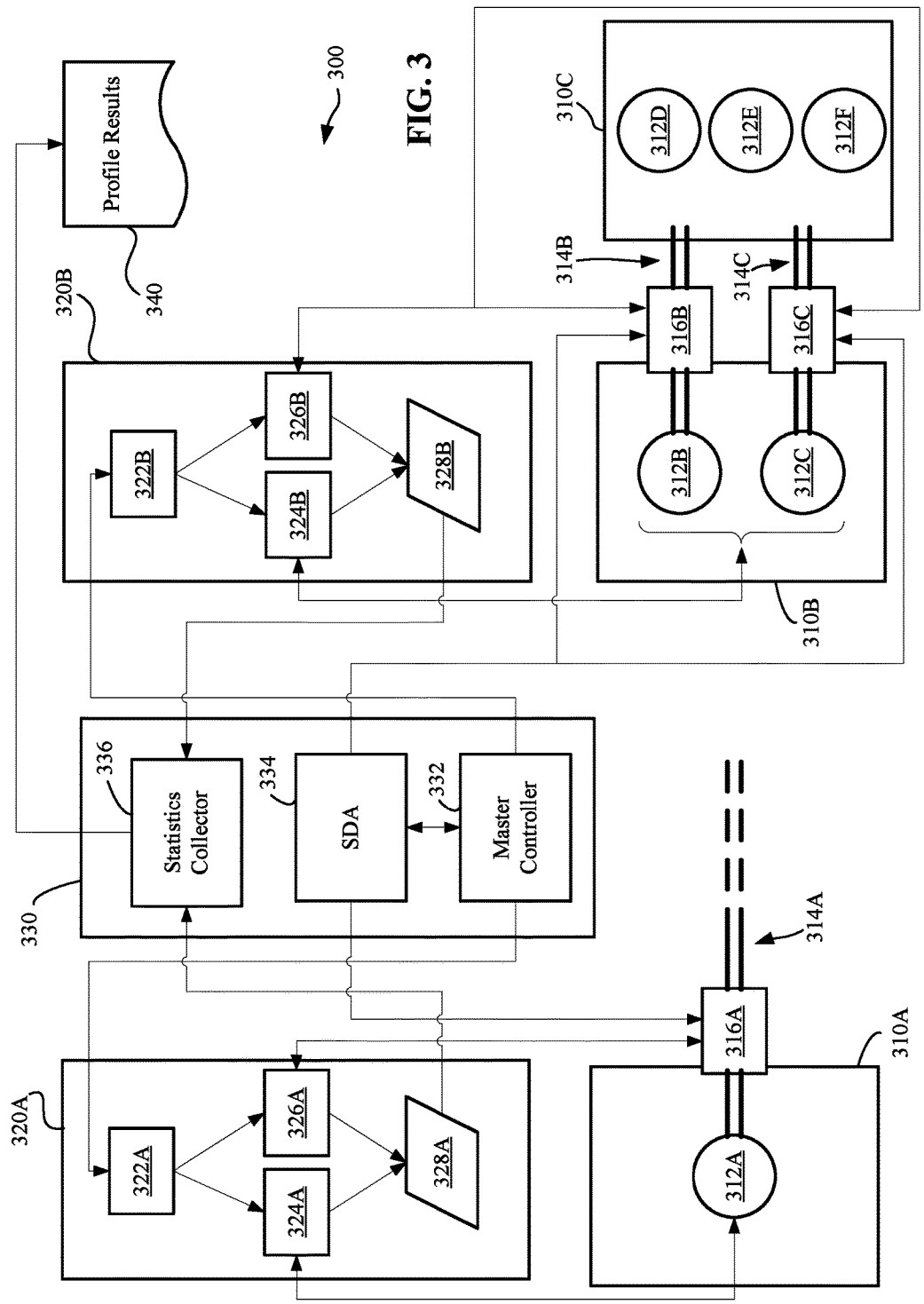

PROFILING MULTIPLE VIRTUAL MACHINES IN A DISTRIBUTED SYSTEM

BACKGROUND

The present disclosure relates to profiling tasks performed in distributed systems, and more specifically, to tracing calls across virtual machines to enable profiling in a distributed computing system.

Distributed computing systems provide a seamless computing experience to end users from a variety of computer hardware and software. These systems may enable more complicated computing tasks with no more complexity to end users. The distributed computing systems may enable computing resources to solve more complex problems than those problems that can be solved on a singular computing device. The distributed computing systems may enable modularity and scalability of computing resources.

SUMMARY

Embodiments of the disclosure may include a method, computer program product, and system of analyzing a task comprising at least a first subtask on a computer system. A profiler controller transmits a first profile instruction to a first profiler instance. The first profile instruction is to profile a first virtual machine. The profiler controller transmits a second profile instruction to a second profiler instance. The second profile instruction is to profile a second virtual machine. In response to the first profile instruction, the first profiler instance embeds a first task identifier into a first subtask request sent by the first virtual machine. The profiler controller receives a first copy of the first task identifier from the first profiler instance. In response to the second profile instruction, the second profiler instance captures the first task identifier from the first subtask request received by the second process virtual machine. The profiler controller receives a second copy of the first task identifier from the second profiler instance. The profiler controller identifies an execution instance of the task of the computer system based on the first copy and the second copy.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 3 depicts the details of a distributed profiler operating within an example system consistent with embodiments of the present disclosure.

Figure 1:
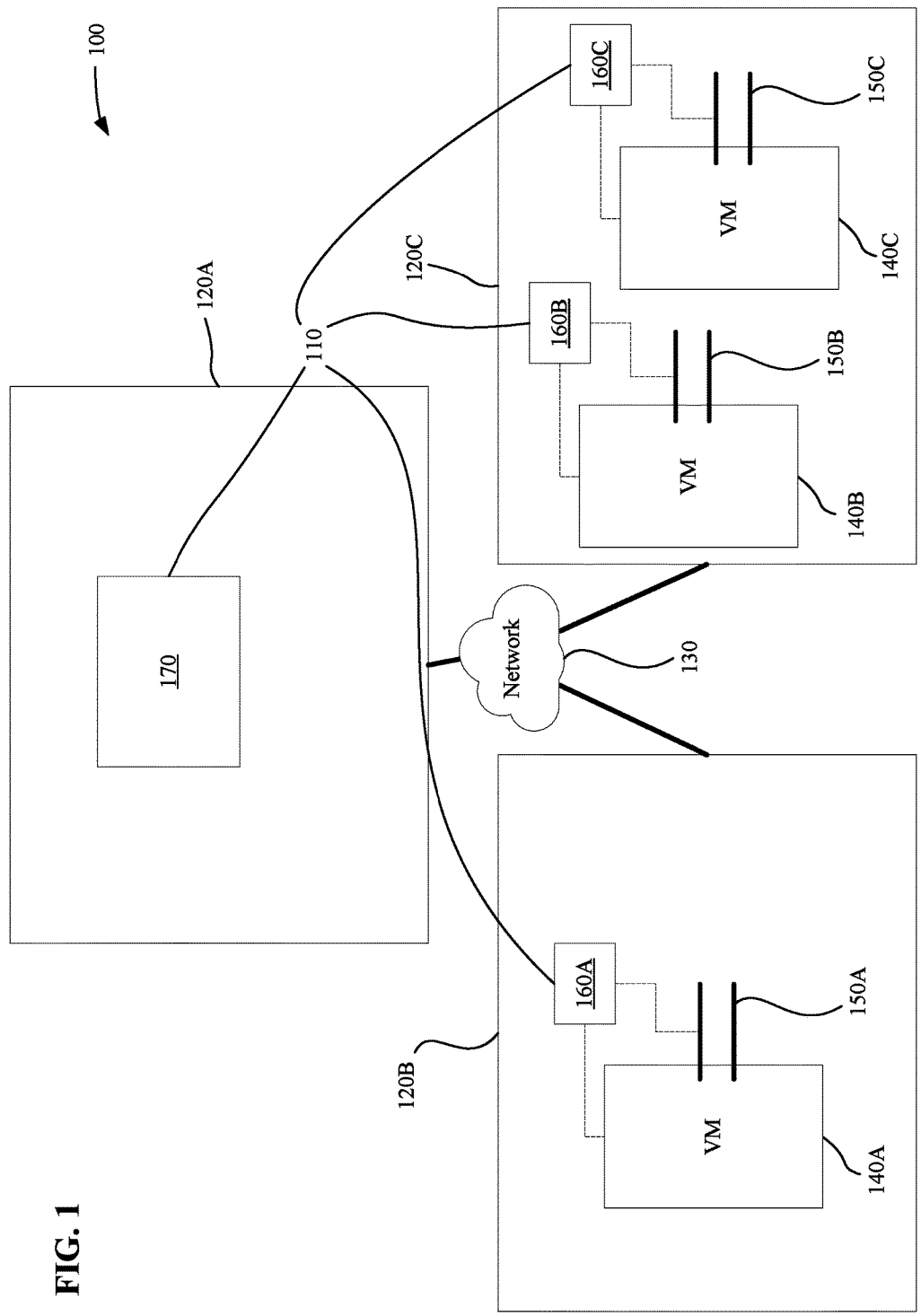
FIG. 1 depicts a distributed profiler operating within an example system consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to profiling tasks performed in distributed systems, more particular aspects relate to tracing calls across virtual machines to enable profiling in a distributed computing system. While the present disclosure is not necessarily limited to such applications, various aspects of the disclosure may be appreciated through a discussion of various examples using this context.

Computing resources are increasingly provided to users through layers of abstraction by distributed computing systems or environments (herein, distributed systems). These distributed systems may provide to users conventional computing resources, such as processing, memory, and long-term storage with increased scalability that a singular computing device cannot provide. Moreover, distributed systems may provide advantages over installations of multiple computers at a single physical location, such as redundancy, and energy efficiency.

For these benefits, and others, distributed systems have been adopted in a variety of industries. In telecommunications services, distributed systems provide the resources to run wireless and wired networks. Ubiquity of service, nurtured through the telephone system, demands that the Internet be provided seamlessly to end users—an ideal demand for distributed systems to meet. Likewise, complex computational problem solving (alternatively, clustering or grip computing) requires massive amounts of processing power. Distributed systems are often the only systems that can operate on the large data sets required by complex computational problem solving. Finally, the ability to take advantage of cloud computing, where ever-present network services meet centralized data and resources, is often not possible without distributed systems.

Historically, software has been created for a single computer system (e.g., a software program that runs on a physical machine). The software performs tasks requested by the user, such as browsing a collection of files, or calculating a mathematical formula. Often, to implement a distributed system, software developers have utilized virtual machines to create software. Virtual machines (alternatively, process virtual machines or system virtual machines) emulate the resources of a typical physical computer or program execution environment in a software construct. Virtual machines provide flexibility and portability to programs, (e.g., a computer system of one architecture can execute software written for another architecture by a virtual machine).

Profilers have enabled software written for a singular computing machine to be observed. As users request tasks to be performed by a software program, a profiler may be able to analyze the software program and provide information about program execution (e.g., memory usage, call patterns, stack information, and timestamps). Additionally, there exist profilers for virtual machines, such that a user may analyze the performance of the software program as it performs tasks. To allow distributed systems to scale upwards in complexity of tasks and number of users, software developers increasingly split tasks into multiple subtasks. This provides a challenge for profilers.

In detail, tasks conventionally performed by a single-machine software program, in a distributed system are divided into subtasks that can be performed by a series of virtual machines. Traditional approaches to profiling software have various drawbacks when determining the performance of multiple virtual machines. A conventional profiler may be adapted to profile the entire task through multiple virtual machines. However, because all communication internal and external of all virtual machines of the distributed system must be recorded, it may be an impractical way to provide meaningful performance information. Additionally, adapted profilers may only record information based on periodic checks, which may exclude some meaningful interaction between virtual machines. An adapted conventional profiler may provide information for a distributed system executing a single task. But as a distributed system scales to perform many tasks concurrently, the information is ineffectual to identify distributed system performance. Using a single profiler to provide information about one of many virtual machines is also of limited value. While any subtasks being performed in the profiled virtual machine may be observed the vast majority of subtasks, those sent to other virtual machines, yield no profiled information. Finally, existing profiling techniques are inoperable to diagnose distributed systems for a variety of other reasons (e.g., unacceptable impact on the function of the distributed system while performing a production-environment load, inability to pinpoint performance problems, inability to provide accurate information, and inability to enable and disable portions of the profiling capability in the middle of a task or tasks being performed).

Consistent with various embodiments, a distributed profiler may enable users to determine performance characteristics of a distributed system. A distributed profiler may comprise a profiler controller and multiple profiler instances. It should be appreciated that in instances where a performance problem is identified in a specific virtual machine of a distributed system, a distributed profiler may operate with a single profiler instance. The distributed profiler may operate separately from any existing virtual machine profiler or system profiler. The distributed profiler may operate in concert with an existing virtual machine profiler by altering the default functionality of an existing virtual machine profiler (e.g., by utilizing delegation). The distributed profiler may monitor a virtual machine while minimally altering performance of the virtual machine, which provides the user with meaningful information regarding the distributed system. The distributed profiler may be able to identify a task that has been subdivided into a variety of subtasks as the subtasks are called and results from the subtasks are returned from a multitude of virtual machines. The distributed profiler may be able to operate across a local area network. The distributed profiler may be able to operate across a wide area network, such as the Internet.

FIG. 1 depicts a distributed profiler 110 operating within an example system 100 consistent with embodiments of the present disclosure. The system 100 may include physical computers 120A, 120B, and 120C (collectively, 120) connected by a network 130. In some embodiments, the network 130 may be a local area network, and the physical computers 120 may be located in the same datacenter. In some embodiments, the network 130 may be a wide area network (e.g., the Internet) and the physical computers 120 may be located in different geographic locations.

A distributed system may operate based upon computers 120B and 120C and may comprise virtual machines 140A, 140B, and 140C (collectively, 140). Computer 120B may execute virtual machine 140A and computer 120C may execute virtual machine 140B and virtual machine 140C. The distributed system may perform tasks for one or more users by dividing each of the tasks into subtasks to be performed by the virtual machines 140. The virtual machines 140 may perform a single subtask. In some embodiments, one or more of the virtual machines 140 may perform multiple subtasks.

The virtual machines 140 may communicate with each other by using one or more communication streams 150A, 150B, and 150C (collectively, 150). Virtual machine 140A may use communication stream 150A, virtual machine 140B may use communication stream 150B, and virtual machine 140C may use communication stream 150C, respectively. The communication streams 150 may send data from and receive data for the virtual machines 140. In some embodiments, the communication streams 150 may be two data streams (e.g., an output stream for sending data, and an input stream for receiving data). In some embodiments, there may be one or more communication streams for each subtask of a given virtual machine. The communication streams 150 may transport subtask calls between the virtual machines 140. The communication streams 150 may transport subtask calls between subtasks of the same virtual machine (e.g., a first subtask on virtual machine 140C may utilize communication stream 150C to transport a subtask call to a second subtask on virtual machine 140C).

The distributed system may provide a service to end users. For example a photo sharing service may be hosted by the distributed system and may be accessible to end users by means of the Internet. The photo sharing service may be divided into a multitude of subtasks (not depicted). Virtual machine 140A may perform the following subtasks: a first subtask for receiving end-user requests for navigating a user-interface, saving and sharing pictures, creating associations between pictures and altering metadata of pictures, and altering content of pictures; a second subtask for receiving pictures from end users; and a third subtask for sharing pictures with services external to the distributed system. Virtual machine 140B may perform the following subtasks: a fourth subtask for detecting faces of humans in pictures and creating metadata based upon the detected faces; a fifth subtask for saving metadata of pictures; and a sixth subtask for saving associations between pictures. Virtual machine 140C may perform the following subtasks: a seventh subtask for saving new pictures uploaded from end-users to long-term storage (not depicted); an eighth subtask for retrieving pictures from the long-term storage; a ninth subtask for altering the content of pictures; and a tenth subtask for rendering the user-interface.

The distributed profiler 110 may comprise profiler instances 160A, 160B, 160C (collectively, 160), and a profiler controller 170. The profiler instances 160 may be capable of profiling the virtual machines 140 as they process subtasks (e.g., profiler instance 160A may profile virtual machine 140A, profiler instance 160B may profile virtual machine 140B, and profiler instance 160C may profile virtual machine 140C). The profiler instances 160 may be able to collect information regarding the virtual machines 140 and any subtasks being performed by the virtual machines 140. In some embodiments, the profiler instances 160 may be able to collect a set of profiler data (i.e., one or more attributes about the virtual machines 140). The profiler instances 160 may embed a unique identifier into subtask calls to track an instance of a task executed by the distributed system.

The profiler controller 170 of the distributed profiler 110 may instruct the profiler instances 160 to begin operation at the same time. In some embodiments, the profiler controller 170 may instruct the profiler instances 160 to begin operation independently of each other, such as instructing only profiler instance 160B to begin operation. The profiler controller 170 may execute on computer 120A and may send communication to the profiler instances 160 through the network 130. In some embodiments, the profiler controller 170 may execute from computer 120B or computer 120C, and communication to one or more of the profiler instances 160 may take place without use of the network 130. The profiler controller 170 may receive profiler information from the profiler instances 160 and may evaluate performance based upon this information. The profiler controller 170 may instruct the profiler instances 160 based upon the profiler information received from the profiler instances.

The profiler controller 170 may know the architecture and topology of the distributed system. The profiler controller 170 may know the interaction between the computers 120, the virtual machines 140, and the communication streams 150 of the distributed system. The profiler controller 170 may know when the virtual machines 140 use the communication streams 150 to communicate internally (e.g., a subtask on virtual machine 140A calling another subtask on virtual machine 140A). The profiler controller 170 may know when the virtual machines 140 use the communication streams 150 to communicate externally (e.g., subtask on virtual machine 140A calling another subtask on virtual machine 140B). The profiler controller 170 may instruct the profiler instances 160 based upon its knowledge.

The distributed profiler 110 may analyze tasks performed by the distributed system. To continue the above example, as users begin to operate the described photo sharing service, the virtual machines 140 cooperatively perform subtasks. If a system administrator wants to observe performance of the photo sharing service while users are using the photo sharing service, the system administrator may utilize the distributed profiler 110. To begin profiling the photo sharing service, the profiler controller 170 may send a first instruction to profiler instance 160A. Profiler instance 160A may begin to profile the operation of virtual machine 140A in response to the first instruction. As users navigate the photo sharing service, subtasks may be performed by virtual machine 140A and attributes of performance may be captured by profiler instance 160A. Profiler instance 160A may record attributes, such as the start times and end times of instances of the first subtask, second subtask, and third subtask described above. Profiler instance 160A may also record other attributes about instances of the first subtask, second subtask, and third subtask (e.g., performance of code sections of the subtasks, names of variables created by the subtasks, memory used by the subtasks, processing cycles of the subtasks, processor utilization of the subtasks, etc.). In some embodiments, profiler instance 160A may also record other attributes about virtual machine 140A generally (e.g., total memory used, total processing time, network utilization, etc.).

Profiler instance 160A may transmit the attributes regarding virtual machine 140A to the profiler controller 170. The profiler controller 170 may identify a first task of the distributed system (e.g., an execution instance of a first user of the photo sharing service) in response to the attributes received by profiler instance 160A. In a usage example, if the first user requests to alter the metadata of some photos, virtual machine 140A may execute a first instance of the first subtask, and profiler instance 160A may identify that the first instance is related to the first user. Virtual machine 140A may also make a first call to virtual machine 140C to render the graphical user interface for the first user. Virtual machine 140C may execute a first instance of the tenth subtask to render the user-interface, a first instance of the ninth subtask to retrieve pictures from long-term storage, and then return execution to virtual machine 140A. The profiler instance 160A may capture attributes of virtual machine 140A before the first call to and after a first return from virtual machine 140C, and may transmit attributes to the profiler controller 170. However, the profiler controller 170 may be unable to understand any detail regarding virtual machine 140C after the first call and before the first return (e.g., subtask performance of virtual machine 140C, resource usage by virtual machine 140C, subtask calls from virtual machine 140C to virtual machine 140B, etc.).

To fully understand execution of the distributed system the profiler controller 170 may transmit through the network 130 a second instruction to profiler instance 160B to profile virtual machine 140B, and a third instruction to profiler instance 160C to profile virtual machine 140C. In response to the second instruction, profiler instance 160B may begin collecting attributes related to the operation of virtual machine 140B. In response to the third instruction, profiler instance 160C may begin collecting attributes related to the operation of virtual machine 140C. Based on the first instruction, the second instruction, and the third instruction the profiler instances 160 may begin encoding subtask calls to the virtual machines 140. The profiler instances 160 may modify the communication streams 150 to encode the subtask calls. This encoding of the subtask calls may include altering the name field of the subtask calls. In some embodiments, the encoding of the subtask calls may include altering other fields, (e.g., an altered identification field, an altered header, an altered footer, an altered unused field, an altered debug field, etc.). The format of the altered field may be a fixed length string. The format of the altered field may be a unique identifier, such as a key. The format of the altered field may be a combination of a values. The format of the altered field may be further modified for speed, size, security, or other reason (e.g., hashing). The altered field may be generated by the profiler instances 160. In some embodiments, the altered field may be generated by the profiler controller 170. Based on the first instruction, the second instruction, and the third instruction the profiler instances 160 may also begin decoding subtask calls from the virtual machines 140. The profiler instances 160 may modify the communication streams 150 to decode the subtask calls. After a subtask call has been processed by one of the virtual machines 140, the virtual machines may generate a subtask return. The profiler instances 160 may encode and decode the subtask returns in a similar manner to the encoding and decoding of the subtask calls.

Referring again to the photo sharing system example above, but prior to the first user requesting to manipulate the metadata of some photos, the profiler controller 170 may transmit instructions to the profiler instances 160A and 160C. In response to the instructions, the profiler instances 160A and 160C may begin to profile the virtual machines 140A and 140C, respectively. In response to the instructions, the profiler instances 160A and 160C may profile the communication streams 150A and 150C, respectively, by encoding subtask calls with unique identifiers. When the first user requests to alter the metadata of some photos, virtual machine 140A may execute a first instance of the first subtask, and the profiler instance 160A may identify that the first instance is related to a first task (the first user manipulating metadata). Profiler instance 160A may record attributes of virtual machine 140A including the execution of the first instance of the first subtask. Virtual machine 140A may make a first call to virtual machine 140C to render the graphical user interface for the first user. Profiler instance 160A may intercept the first call to virtual machine 140C and embed a first identifier into the first call, copy the first identifier, and pass the first call to the communication stream 150A. Profiler instance 160A may associate the recorded attributes with the first identifier, and pass the recorded attributes and the first identifier to the profiler controller 170.

When communication stream 150C receives the first call for virtual machine 140C, profiler instance 160C may intercept the first call. Profiler instance 160C may copy the first identifier from the first call, remove the first identifier from the first call, and pass the first call to virtual machine 140C. Virtual machine 140C may execute a first instance of the tenth subtask to render the user-interface and a first instance of the ninth subtask to retrieve pictures from long-term storage in response to the first call. Profiler instance 160C may record attributes of virtual machine 140C including the execution of the first instance of the tenth subtask and the execution of the first instance of the ninth subtask. After execution, virtual machine 140C may transmit a first return from the first call to virtual machine 140A. Profiler instance 160C may associate the recorded attributes with the first identifier. Profiler instance 160C may intercept the first return, embed the first identifier into the first return, and pass the first return to communication stream 150C. Profiler instance 160C may associate the recorded attributes with the first identifier and transmit the attributes of execution by virtual machine 140C and the first identifier to the profiler controller 170.

When communication stream 150A receives the first return for virtual machine 140A, profiler instance 160A may intercept the first return. Profiler instance 160A may copy the first identifier from the first return, remove the first identifier from the first return, and pass the first return to virtual machine 140A. As virtual machine 140A continues performing subtasks for the first user, the profiler instance 160A may continue to record attributes and associate the attributes with the first identifier. Profiler instance 160A may transmit the attributes of execution by virtual machine 140A and the first identifier to the profiler controller 170.

The profiler controller 170 may identify an instance of the task (the first user manipulating metadata) being executed based upon the attributes and the copies of the first identifier sent from profiler instances 160A and 160C. As execution continues and other subtasks are executed by the virtual machines 140A and 140C, the profiler instances 160A and 160C may continue to associate subtasks and subtask calls with the task, and the profiler controller 170 may continue to identify the execution instance of the task and sets of profiler data related to the task. During execution of the distributed profiler 110, if the administrator wants to capture performance of virtual machine 140B, the profiler controller 170 may transmit an instruction to profiler instance 160B. In response to the instruction, operation of profiler instance 160B may commence similarly to operation of profiler instances 160A and 160C. If multiple users are executing tasks on the distributed system at the same time, the distributed profiler 110 may coordinate execution of the subtasks by the distributed system in the same way (e.g., a second task comprised of a second set of subtasks executed by the virtual machines 140 is identified by the profiler controller 170, a third task comprised of a third set of subtasks executed by the virtual machines is identified by the profiler controller, etc.). As they are identified each task may be associated with a different unique identifier to ensure the profiler controller 170 may be able to evaluate the performance of each task in the distributed system.

Figure 2A:
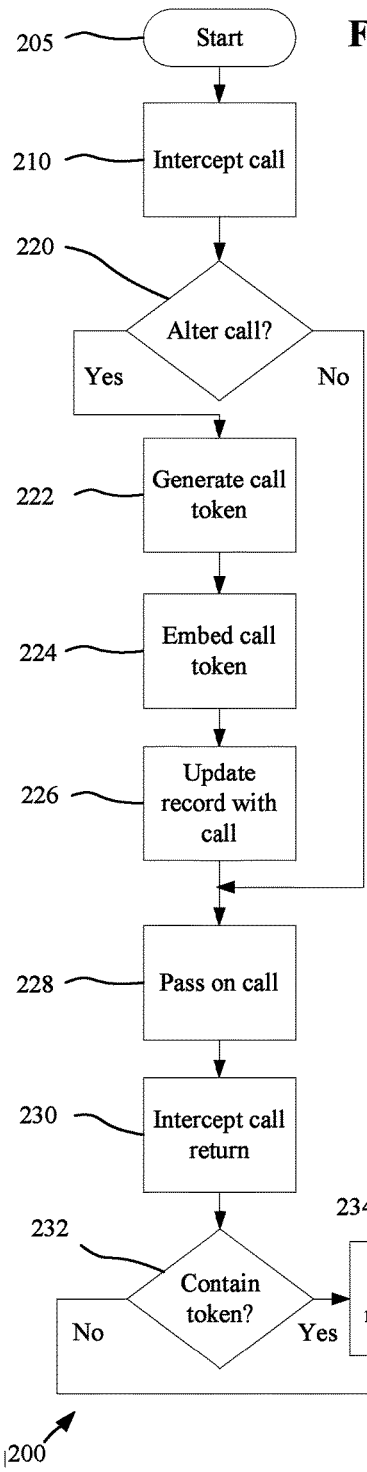
FIG. 2A depicts a flowchart of a first example method of using a first socket profiler consistent with embodiments of the present disclosure.

FIG. 2A depicts a flowchart of a first example method 200 of using a first socket profiler consistent with embodiments of the present disclosure. A first profiler instance of a distributed profiler may include the first socket profiler and a first local profiler. The first socket profiler may operate by modifying code segments of a first virtual machine. The first socket profiler may embed one or more socket monitors into one or more communication sockets of the first virtual machine. The first socket profiler may operate based on one or more instructions from a profiler controller.

Each profiler instance of a distributed profiler may include a socket profiler and a local profiler. In some embodiments, method 200 of using the socket profiler may be executed by each profiler instance of the distributed profiler. Further, some operations of method 200 may be executed by both each of the profiler instances and the profiler controller of the distributed profiler. The method 200 may comprise only a portion of execution of each profiler instance and additional methods (not depicted) may also be performed.

At start 205, the first profiler instance may begin to intercept calls 210 of communication from the first virtual machine, (e.g., from an outbound communication socket of the first virtual machine). This ability to intercept calls 210 may be enabled by altering the code of the first virtual machine, such as embedding an outbound communication monitor. The outbound communication monitor may operate based on a network socket application programming interface. Because the outbound communication monitor may operate at the socket level, any higher level communication may be captured by the intercepting of calls 210. At 220, a determination may be made as to whether a call should be altered. The determination of call alteration at operation 220 may be based upon a set of rules (e.g., one or more values related to the distributed system, one or more values related to the distributed profiler). The set of rules may be received from the profiler controller. The set of rules may be based upon whether a call is intended for a different virtual machine. The set of rules may be based upon the name of a subtask being called by the call. The set of rules may be based upon a network address in the call. The set of rules may be based upon whether the virtual machine specified in the call is also being profiled by the distributed profiler.

If a determination is made that the call should be altered, at 220, a call token is generated by the first socket profiler at 222. In some embodiments, the call token may be generated by the profiler controller. The call token may be a unique identifier. The call token may be generated by altering an existing value of the first virtual machine, such as a date field or name field. The call token may be generated by combining multiple fields or values together. The newly generated call token may be embedded into the call at 224. The call token may be embedded by overwriting an entire field, such as the name field of the call. The call token may be embedded by appending a field, such as by being inserted into the beginning of the id field of the call. At 226, the first socket profiler may update a local record cache of the first profiler instance with a set of profiler data regarding the call. The record may also be updated with the token from the call. The updated record may be transmitted by the first profiler instance to the profiler controller.

After the call record is updated, per 226 (or after 220 if it is determined that the call should not be altered), the first socket profiler will instruct the socket monitor to pass the call to the output communication functionality of the first virtual machine at 228. The first virtual machine may then pass the call to an appropriate second virtual machine, and the second virtual machine may execute subtasks based upon the call. The second virtual machine may generate a call return and may transmit the call return to the first virtual machine. The first socket profiler may intercept call returns, at 230, of communication from the second virtual machine. The functionality of intercepting call returns, at 230, may be enabled by altering the code of an inbound communication socket of the first virtual machine, such as by inserting an inbound communication monitor. The inbound communication monitor may operate based on the network socket application programming interface.

At 232, a determination if the call return contains a token may be performed. In some embodiments, the determination at 232 may be made as to whether a call return should be altered. The determination of call return alteration at 232 may be based upon a set of rules similar to the rules for determining call alteration at 220. The determination of call return alteration, at 232, may also be based upon the record kept by the first profiler instance. For example, if the call was altered by having a call token embedded, the first socket profiler may compare the intercepted call return with the record and determine if the token exists.

If a determination is made that the call return contains a token, at 232, the token may be stripped from the call return at 234. At 236, the first socket profiler may update the local records of the first profiler instance with a set of profiler data regarding the call return. The record may also be updated with the token from the call return. After the records are updated, per 236 (or after 232 if the determination is made that the call return does not contain the call token), the call return is passed to the first virtual machine for execution at 238 and method 200 ends at 245.

Figure 2B:
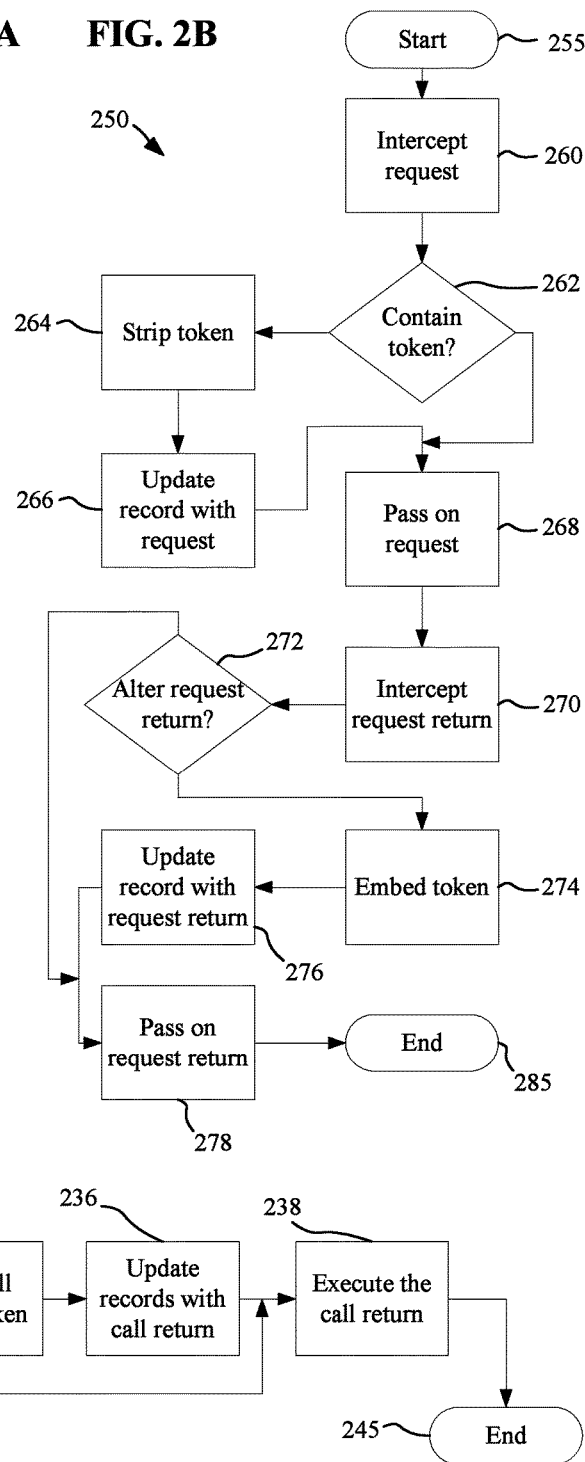
FIG. 2B depicts a flowchart of a second example method of using a second socket profiler consistent with embodiments of the present disclosure.

FIG. 2B depicts a flowchart of a second example method 250 of using a second socket profiler consistent with embodiments of the present disclosure. A second profiler instance of a distributed profiler may include the second socket profiler and a second local profiler. The second socket profiler may operate by modifying code segments of a second virtual machine (e.g., the second virtual machine in the description of FIG. 2A). The second socket profiler may embed one or more socket monitors into one or more communication sockets of the second virtual machine. The second socket profiler may operate based on one or more instructions from a profiler controller (e.g., the profiler controller in the description of FIG. 2A).

Each profiler instance of a distributed profiler may include a socket profiler and a local profiler. In some embodiments, method 250 of using the socket profiler may be executed by each profiler instance of the distributed profiler. Further, some operations of method 250 may be executed by both each of the profiler instances and the profiler controller of the distributed profiler. The method 250 may comprise only a portion of execution of each profiler instance and additional methods (not depicted) may also be performed.

At start 255, a second profiler instance may begin to intercept requests 260 of communication transmitted to the second virtual machine, (e.g., from an inbound communication socket of the second virtual machine). This ability to intercept requests 260 may be enabled by altering the code of the second virtual machine, such as embedding an inbound communication monitor. The inbound communication monitor may operate based on a network socket application programming interface. At 262, a determination may be made as to whether a request (e.g., the call in the description of FIG. 2A) contains a token. The determination at operation 262 may be based upon a second set of rules (e.g., one or more values related to the distributed system, one or more values related to the second distributed profiler). The second set of rules may be received from the profiler controller.

If a determination is made that the request contains a token, at 262, the request token is stripped by the second socket profiler at 264. At 266, the second socket profiler may update a second local record cache of the second profiler instance with a set of profiler data regarding the request. The second record may also be updated with the token from the request (e.g., a copy of the token in the description of FIG. 2A). The updated second record may be transmitted by the second profiler instance to the profiler controller. The second socket profiler may then pass the request to the second virtual machine at 268.

If it is determined that the request does not contain a token, at 262, then the second socket profiler will instruct the second socket monitor to pass the request to the second virtual machine at 268. The second virtual machine may then execute subtasks based upon the request. The second virtual machine may generate a request return (e.g., the call return in the description of FIG. 2A) and may transmit the request return to the first virtual machine. The second socket profiler may intercept request returns, at 270, of communication from the second virtual machine. The functionality of intercepting request returns, at 270, may be enabled by altering the code of an outbound communication socket of the second virtual machine, such as by inserting an outbound communication monitor. The outbound communication monitor may operate based on the network socket application programming interface.

At 272, a determination if the request return should be altered may be made based upon the second record kept by the second profiler instance. For example, whether the request related to the request return contained a token. If a determination is made that the request return should be altered, at 272, the token may be embedded in the request return at 274. At 276, the second socket profiler may update the second local records of the second profiler instance with a set of profiler data regarding the request return. The second record may also be updated with the token from the request return. After the second local records are updated, per 226 (or if it is determined at 272 that the request return should not be altered), then the second socket profiler may instruct the second socket monitor to pass the request return to the output communication functionality of the second virtual machine at 228 and method 250 ends at 285.

FIG. 3 depicts the details of a distributed profiler operating within an example system 300 consistent with embodiments of the present disclosure. The distributed profiler may profile a distributed system that includes virtual machines 310A, 310B, and 310C (collectively, 310). The virtual machines 310 may execute subtasks 312A, 312B, 312C, 312D, 312E, and 312F (collectively, 312). The virtual machines 310 may utilize communication streams 314A, 314B, and 314C (collectively, 314) to transmit subtask requests and responses between one another. It should be appreciated that the distributed system is provided for example purposes and may vary in its architecture (e.g., the number of virtual machines, the number of subtasks, the assignment of subtasks to virtual machines, the configuration of the communication streams, etc.).

The distributed profiler may comprise profiler instances 320A and 320B (collectively, 320) and a profiler controller 330. Profiler instance 320A may comprise a profiler loader 322A, a local profiler 324A, and a socket profiler 326A.

Local profiler 324A and socket profiler 326A may record one or more attributes regarding virtual machine 310A into a local runtime record 328A. Profiler instance 320B may comprise a profiler loader 322B, a local profiler 324B, and a socket profiler 326B. Local profiler 324B and socket profiler 326B may record one or more attributes regarding virtual machine 310B into a local runtime record 328B. The profiler loaders 322A and 322B (collectively, 322) may direct operation of local profilers 324A and 324B (collectively, 324), respectively. The profile loaders 322A and 322B may also direct operation of socket profilers 326A and 326B (collectively, 326), respectively. The profiler loaders 322 may direct operation based on standard byte code instrumentation. The profiler loaders 322 may receive communication from the profiler controller 330. The profiler loaders 322 may direct operation of the local profilers 324 and the socket profilers 326 independently.

The local profilers 324 may profile virtual machines 310. In detail, local profiler 324A may profile virtual machine 310A and subtask 312A. Local profiler 324B may profile virtual machine 310B and subtasks 312B and 312C. The local profilers 324 may profile by collecting attributes of the virtual machines 310A and 310B, such as subtask call times and frequencies of function execution. The local profilers 324A and 324B may record the attributes into the local runtime records 328A and 328B (collectively, 328), respectively. In some embodiments, the local profilers 324 may keep track of the subtasks and subtask calls to identify a call-chain (alternatively, execution instance) corresponding to a task executed by the distributed system. In some embodiments, the local profilers 324 may associate the call-chains and other attributes with a unique identifier.

The socket profilers 326 may profile the communication streams 314. In detail, socket profiler 326A may profile communication stream 314A. Socket profiler 326B may profile communication streams 314B and 314C. The socket profilers 324 may profile by collecting attributes of the communication streams 314, such as subtask calls, subtask call identifiers, and called virtual machine names or identifiers. The socket profilers 326A and 326B may record the attributes into the local runtime records 328A and 328B, respectively. In some embodiments, the socket profilers 326 may add to, append, or modify the call-chains and other attributes in the local runtime records 328. The socket profilers 326 may intercept the communication streams 314 and alter subtask calls. The socket profilers 326 may use a modified version of stream monitors 316A, 316B, and 316C (collectively, 316) of the communication streams 314. The socket profilers 326 may use modified versions of input stream monitor code segments and output stream monitor code segments of the stream monitors 316 to intercept and alter subtask calls. The modified version of the stream monitors 316 may utilize code delegation techniques. The stream monitors 316 may be existing code segments that are a part of the communication streams 314 that are associated with the virtual machines 312.

The modified version of the output stream monitor of the stream monitors 316 may generate the unique identifier. The unique identifier may be in a standardized form recognized by all of the profiler instances 320. The unique identifier may be generated using known coding techniques, such as fixed length keys, random number generators, multiple field combinations, field prefixes and suffixes, combinations of existing fields and newly generated unique identifiers, etc.

The profiler controller 330 of the distributed profiler may comprise a master controller 332, a system deployment architecture 334 (herein, SDA), and a statistics collector 336. The profiler controller 330 may unify and categorize data from the profiler instances 320 to provide meaningful information regarding the distributed system, such as call-chains of the subtasks 312 across virtual machines 310. The master controller 332 may transmit instructions to the profiler loaders 322. The instructions from the master controller 332 may command the local profilers 324 or the socket profilers 326 to begin or cease operation. The master controller 332 may instruct the operation of the various components of the profiler instances 320 independently of each other. The master controller 332 may instruct the operation of profiler instance 320A independently of profiler instance 320B. In some embodiments, the master controller 332 may transmit operation of a given profiler instance to the SDA 334. The master controller 332 may receive requests from an end-user of the distributed profiler (e.g., a system administrator).

The SDA 334 of the profiler controller 330 may retrieve operation of a given profiler instance from the master controller 332. The SDA 334 may have knowledge of the layout and operation of the distributed system, such as which virtual machines execute which subtasks and which communication streams are used by which virtual machines for external communication to other virtual machines. In some embodiments, the SDA 334 may have knowledge of the operation of the distributed system that is not directly profiled by the distributed profiler (e.g., the organization of virtual machine 310C and of subtasks 312D, 312E, and 312F). The SDA 334 may have knowledge of operation of the profiler instances 320. The SDA 334 may instruct the profiled output stream monitor of the stream monitors 316. The SDA 334 may instruct a given profiled output stream monitor to embed unique identifiers into subtask calls. The SDA 334 may instruct the stream monitors 316 based upon the knowledge of the distributed system and the knowledge of operation of the profiler instances 320.

The statistics collector 336 of the profiler controller 330 may generate profiler information for the end-user. The statistics collector 336 may retrieve attributes and associated unique identifiers from the local runtime records 328. The statistics collector 336 may analyze the attributes and unique identifiers from the local runtime records 328 to generated profiler information. The statistics collector 336 may generate summaries based upon information collected from the local runtime records 328 (e.g., execution instances, subtask call-chains, identified tasks across virtual machines 310, aggregate execution time, etc.). The statistics collector 336 may output the profiler information to a profiler results 340 file or table.

The distributed profiler may be able to identify patterns of execution that slow operation of the distributed system. For example, the distributed system may be performing three different tasks. The tasks may be comprised of a series of subtasks 312, subtask calls, and subtask returns. The first task may comprise the following: subtask 312A, a call to subtask 312B, subtask 312B, a call to subtask 312D, subtask 312D, a return to subtask 312B, and a return to subtask 312A. The second task may comprise the following: subtask 312A, a call to subtask 312B, subtask 312B, a call to subtask 312E, subtask 312E, a call to subtask 312B, subtask 312B, a return to subtask 312E, a return to subtask 312B, and a return to subtask 312A. The third task may comprise the following: subtask 312A, a call to subtask 312C, subtask 312C, a call to subtask 312B, subtask 312B, a call to subtask 312F, subtask 312F, a return to subtask 312B, a return to subtask 312C, a call to subtask 312E, subtask 312E, a return to subtask 312C, and a return to subtask 312A.

To continue the example, the master controller 332 may instruct profiler instance 320A to begin profiling virtual machine 310A. The local profiler 324A may monitor subtask 312A and record profiling information into local runtime record 328A. As the first task, the second task, and the third task are performed, the local profiler 324A may only profile subtask 312A and record any calls to subtasks located on virtual machine 310B. (e.g., calls to subtasks 312B and 312C). But, the distributed profiler may not record any profiling information of the distributed system until a return to subtask 312A occurs.

The master controller 332 may instruct profiler instance 320B to begin profiling virtual machine 310B. The SDA 334 may detect that profiler instance 320B has been instructed to begin profiling virtual machine 310B, and may instruct stream monitor 316A to encode unique identifiers into subtask calls to virtual machine 310B. As the profiler instances 320 profile virtual machines 310A and 310B, the local profilers 324 and socket profilers 326 may record and associate profiling information with the unique identifiers. As execution of the distributed system occurs now the local profilers 324 and the socket profilers 326 of profiler instance 320A and 320B may record profiling information of the distributed system into the local runtime records 328A and 328B, respectively. The statistics collector 336 may retrieve the profiler information from the local runtime records 328 and may generate call-chains and other performance related data about the execution of the first, second, and third tasks by the distributed system. The statistics collector 336 may record the call-chains and performance related data into the profile results 340. From the profile results 340, an end user may be able to see execution time of all subtasks 312 that make up each of the first, second, and third tasks. An issue related to performance may be observed from this information (e.g., execution of the third task while three instances of the first task are being performed causes the distributed system to run out of memory).

Figure 4:
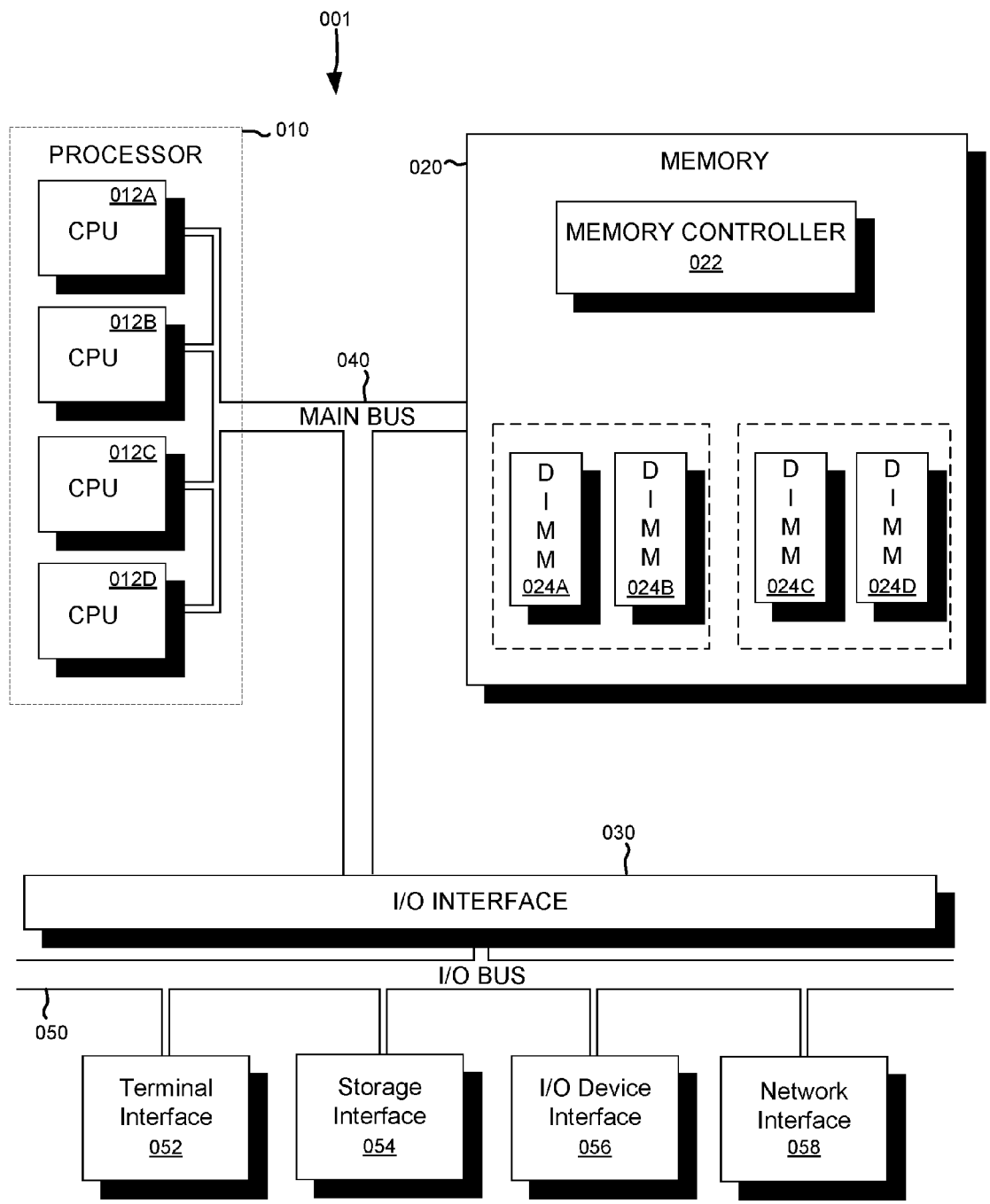
FIG. 4 depicts the representative major components of an exemplary computer system that may be used in accordance with embodiments of the invention.

FIG. 4 depicts the representative major components of an exemplary computer system 001 that may be used in accordance with embodiments of the invention. It is appreciated that individual components may have greater complexity than represented in FIG. 4, components other than or in addition to those shown in FIG. 4 may be present, and the number, type, and configuration of such components may vary. Several particular examples of such complexities or additional variations are disclosed herein. The particular examples disclosed are for exemplar purposes only and are not necessarily the only such variations. The computer system 001 may comprise a processor 010, memory 020, an input/output interface (herein I/O or I/O interface) 030, and a main bus 040. The main bus 040 may provide communication pathways for the other components of the computer system 001. In some embodiments, the main bus 040 may connect to other components such as a specialized digital signal processor (not depicted).

The processor 010 of the computer system 001 may be comprised of one or more CPUs 012A, 012B, 012C, 012D (herein 012). The processor 010 may additionally be comprised of one or more memory buffers or caches (not depicted) that provide temporary storage of instructions and data for the CPUs 012. The CPUs 012 may perform instructions on input provided from the caches or from the memory 020 and output the result to caches or the memory. The CPUs 012 may be comprised of one or more circuits configured to perform one or methods consistent with embodiments of the invention. In some embodiments, the computer system 001 may contain multiple processors 010 typical of a relatively large system; however, in other embodiments the computer system may alternatively be a single processor with a singular CPU 012.

The memory 020 of the computer system 001 may be comprised of a memory controller 022 and one or more memory modules 024A, 024B, 024C, 024D (herein 024). In some embodiments, the memory 020 may comprise a random-access semiconductor memory, storage device, or storage medium (either volatile or non-volatile) for storing data and programs. The memory controller 022 may communicate with the processor 010 facilitating storage and retrieval of information in the memory modules 024. The memory controller 022 may communicate with the I/O interface 030 facilitating storage and retrieval of input or output in the memory modules 024. In some embodiments, the memory modules 024 may be dual in-line memory modules (DIMMs).

The I/O interface 030 may comprise an I/O bus 050, a terminal interface 052, a storage interface 054, an I/O device interface 056, and a network interface 058. The I/O interface 030 may connect the main bus 040 to the I/O bus 050. The I/O interface 030 may direct instructions and data from the processor 010 and memory 030 to the various interfaces of the I/O bus 050. The I/O interface 030 may also direct instructions and data from the various interfaces of the I/O bus 050 to the processor 010 and memory 030. The various interfaces may comprise the terminal interface 052, the storage interface 054, the I/O device interface 056, and the network interface 058. In some embodiments, the various interfaces may comprise a subset of the aforementioned interfaces (e.g., an embedded computer system in an industrial application may not include the terminal interface 052 and the storage interface 054).

Logic modules throughout the computer system 001—including but not limited to the memory 020, the processor 010, and the I/O interface 030—may communicate failures and changes to one or more components to a hypervisor or operating system (not depicted). The hypervisor or the operating system may be allocate the various resources available in the computer system 001 and track the location of data in memory 020 and of processes assigned to various CPUs 012. In embodiments that combine or rearrange elements, aspects of the logic modules capabilities may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of analyzing a task on a computer system, the task comprising at least a first subtask, the method comprising:
    transmitting, by a profiler controller to a first profiler instance, a first profile instruction to profile a first process virtual machine;
    transmitting, by the profiler controller to a second profiler instance, a second profile instruction to profile a second process virtual machine;
    embedding, by the first profiler instance and in response to the first profile instruction, a first task identifier into a first subtask request, the first subtask request sent by the first process virtual machine;
    receiving, by the profiler controller, a first copy of the first task identifier from the first profiler instance;

capturing, by the second profiler instance and in response to the second profile instruction, the first task identifier from the first subtask request, the first subtask request received by the second process virtual machine;

receiving, by the profiler controller, a second copy of the first task identifier from the second profiler instance; and identifying, by the profiler controller, an execution instance of the task of the computer system based on the first copy of the first task identifier and the second copy of the first task identifier.

2. The method of claim 1, wherein the identifying the execution instance includes generating a report related to performance of the task of the computer system.

3. The method of claim 2, wherein the report includes a second subtask that called the first subtask, the second subtask executed by the first process virtual machine, and wherein the report further includes a third subtask that was called by the first subtask.

4. The method of claim 3, wherein the third subtask was executed by the second process virtual machine.

5. The method of claim 1 further comprising:
collecting, by the first profiler instance, a first set of profiler data related to the first process virtual machine;
receiving, by the profiler controller, the first set of profiler data from the first profiler instance;
collecting, by the second profiler instance, a second set of profiler data related to the second process virtual machine;
receiving, by the profiler controller, the second set of profiler data from the second profiler instance;
determining, by the profiler controller, a performance characteristic based on the first set of profiler data and the second set of profiler data.

6. The method of claim 5, wherein the performance characteristic is selected from the group consisting of time for processing the task, time for processing subtasks related to the task, patterns of subtask calls that affect performance of the task, patterns of subtask execution that affect performance of the task, datasets that affect performance of the task, alterations of datasets based on execution of the task, and performance of the computer system based on concurrency of multiple tasks.

7. The method of claim 1 further comprising:
associating, by the second profiler instance, a second subtask with the first task identifier;
collecting, by the second profiler instance, a first set of profiler data related to the second subtask;
receiving, by the profiler controller, the first set of profiler data and a third copy of the first task identifier from the second profiler instance; and
associating, by the profiler controller, the second subtask with the execution instance of the task of the computer system based on the first set of profiler data and the third copy of the first task identifier.

8. The method of claim 7, wherein the second subtask is executed by the second process virtual machine.

9. The method of claim 1, wherein the execution instance is provided to an end user.

10. The method of claim 1, wherein the first profiler instance and the profiler controller are located on the same physical computer.

11. The method of claim 1, wherein the first process virtual machine and the second process virtual machine are located on the same physical computer.

* * * * *